(12) United States Patent
Murakami et al.

(10) Patent No.: US 8,649,673 B2
(45) Date of Patent: Feb. 11, 2014

(54) IMAGE PICKUP APPARATUS IMPROVED IN SPACE EFFICIENCY FOR OPTICAL SYSTEM ELEMENT

(75) Inventors: Taro Murakami, Tokyo (JP); Takumi Uehara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 55 days.

(21) Appl. No.: 13/163,354

(22) Filed: Jun. 17, 2011

(65) Prior Publication Data

US 2011/0317989 A1    Dec. 29, 2011

(30) Foreign Application Priority Data

Jun. 29, 2010 (JP) ................................. 2010-147604

(51) Int. Cl.
*G03B 17/00* (2006.01)

(52) U.S. Cl.
USPC ............................................ 396/72; 396/535

(58) Field of Classification Search
USPC ............................... 396/72, 535; 348/E5.028;
359/402–406, 207.8, 678, 694, 831
See application file for complete search history.

(56) References Cited

U.S. PATENT DOCUMENTS

| | | | |
|---|---|---|---|
| 7,170,558 B2* | 1/2007 | Yokota et al. ................. | 348/337 |
| 7,180,542 B2* | 2/2007 | Iwasawa et al. ........... | 348/240.3 |
| 7,307,797 B2* | 12/2007 | Yoshitsugu et al. .......... | 359/689 |
| 7,626,766 B2* | 12/2009 | Yoshitsugu et al. .......... | 359/683 |
| 7,692,869 B2* | 4/2010 | Yamaguchi et al. .......... | 359/676 |
| 7,889,436 B2* | 2/2011 | Wada .............................. | 359/676 |
| 7,898,745 B2* | 3/2011 | Matsui et al. .................. | 359/694 |
| 2010/0014171 A1* | 1/2010 | Yamamoto et al. ........... | 359/736 |
| 2011/0292523 A1* | 12/2011 | Uehara et al. ................. | 359/699 |

FOREIGN PATENT DOCUMENTS

| | | |
|---|---|---|
| CN | 101630111 A | 1/2010 |
| JP | 2009-122640 | 6/2009 |

OTHER PUBLICATIONS

The above reference was cited in a Jul. 3, 2013 Chinese Office Action, which is enclosed with an English Translation, that issued in Chinese Patent Application No. 201110184494.X.

* cited by examiner

*Primary Examiner* — Clayton E LaBalle
*Assistant Examiner* — Warren K Fenwick
(74) *Attorney, Agent, or Firm* — Cowan, Liebowitz & Latman, P.C.

(57) ABSTRACT

An image pickup apparatus which is improved in space efficiency for an optical system element, thereby reducing the apparatus size when a lens barrel is retracted. An image pickup apparatus includes a zoom lens barrel that moves between a retracted position and a shooting position in an optical axis direction to thereby change a photographing magnification. A prism bends an optical beam incident from a lens group of the lens barrel. A diaphragm-shutter element is capable of moving along the direction of the second optical axis together with a stepping motor for actuating the diaphragm-shutter element. The stepping motor is disposed, at least when the lens group is in the retracted position, at a position where the stepping motor overlaps the prism in parallel with the second optical axis.

6 Claims, 10 Drawing Sheets

IMAGE PICKUP APPARATUS IMPROVED IN SPACE EFFICIENCY FOR OPTICAL SYSTEM ELEMENT

BACKGROUND OF THE INVENTION

1. Field of the Invention

The present invention relates to an image pickup apparatus, such as a silver halide camera (film-based camera), a digital camera, and a digital video camera, including a zoom lens barrel that moves between a collapsed position and a shooting position in an optical axis direction, to change a photographing magnification.

2. Description of the Related Art

As an image pickup apparatus, such as a digital camera, provided with a zoom lens barrel, there has been proposed an image pickup apparatus including a reflective optical element, such as a prism, which, in order to reduce the size of the image pickup apparatus, bends a light beam incident via a plurality of lens groups, in a direction intersecting with the optical axis of the lens groups, to thereby guide the light beam to an image pickup element (Japanese Patent Laid-Open Publication No. 2009-122640). In this proposal, when the lens barrel is in a shooting position, a reflective optical element is disposed rearward of the lens groups in the direction of the optical axis thereof, and bends the light beam incident from the lens groups toward the image pickup element. Further, when the lens barrel is in a collapsed position, the reflective optical element and one of the lens groups are retracted toward the image pickup element side, whereby the lens groups including the remainder of the lens groups are retracted into the collapsed position.

However, in Japanese Patent Laid-Open Publication No. 2009-122640, an actuator is fixed for moving an optical system element, such as a diaphragm-shutter element and lens groups, disposed between the reflective optical element and the image pickup element. Therefore, the space efficiency for the optical system element disposed between the reflective optical element and the image pickup element is degraded, which hinders reduction of the size of the image pickup apparatus when the lens barrel is retracted.

SUMMARY OF THE INVENTION

The present invention provides an image pickup apparatus which is improved in space efficiency for an optical system element disposed in a direction of a second optical axis which intersects with a first optical axis direction along which a lens group is movable, thereby realizing reduction of the apparatus size when a lens barrel is retracted.

The present invention provides an image pickup apparatus including a zoom lens barrel that moves between a collapsed position and a shooting position in an optical axis direction to thereby change a photographing magnification, comprising a lens group movably disposed along a first optical axis, a reflective optical element configured to be movable along a second optical axis extending in a direction intersecting with the first optical axis, and to bend a light beam incident from the lens group in a direction of the second optical axis, to thereby guide the light beam to an image-forming plane when the lens group has moved to the shooting position along the first optical axis, and move to a retracted position along the second optical axis to form a space for accommodating the lens group when the lens group has moved to the collapsed position along the first optical axis, and an optical system element disposed between the reflective optical element and the image-forming plane, wherein the optical system element can be moved in the direction of the second optical axis together with an actuator for actuating the optical system element, the actuator being disposed, at least when the lens group is in the collapsed position, at a location where the actuator overlaps the reflective optical element in parallel with the second optical axis.

According to the present invention, it is possible to improve the space efficiency for the optical system element disposed in the direction of the second optical axis, thereby making it possible to reduce the size of the image pickup apparatus when the lens barrel is retracted.

The features and advantages of the invention will become more apparent from the following detailed description taken in conjunction with the accompanying drawings.

DETAILED DESCRIPTION OF THE EMBODIMENTS

The present invention will now be described in detail below with reference to the accompanying drawings showing embodiments thereof.

Figure 1:
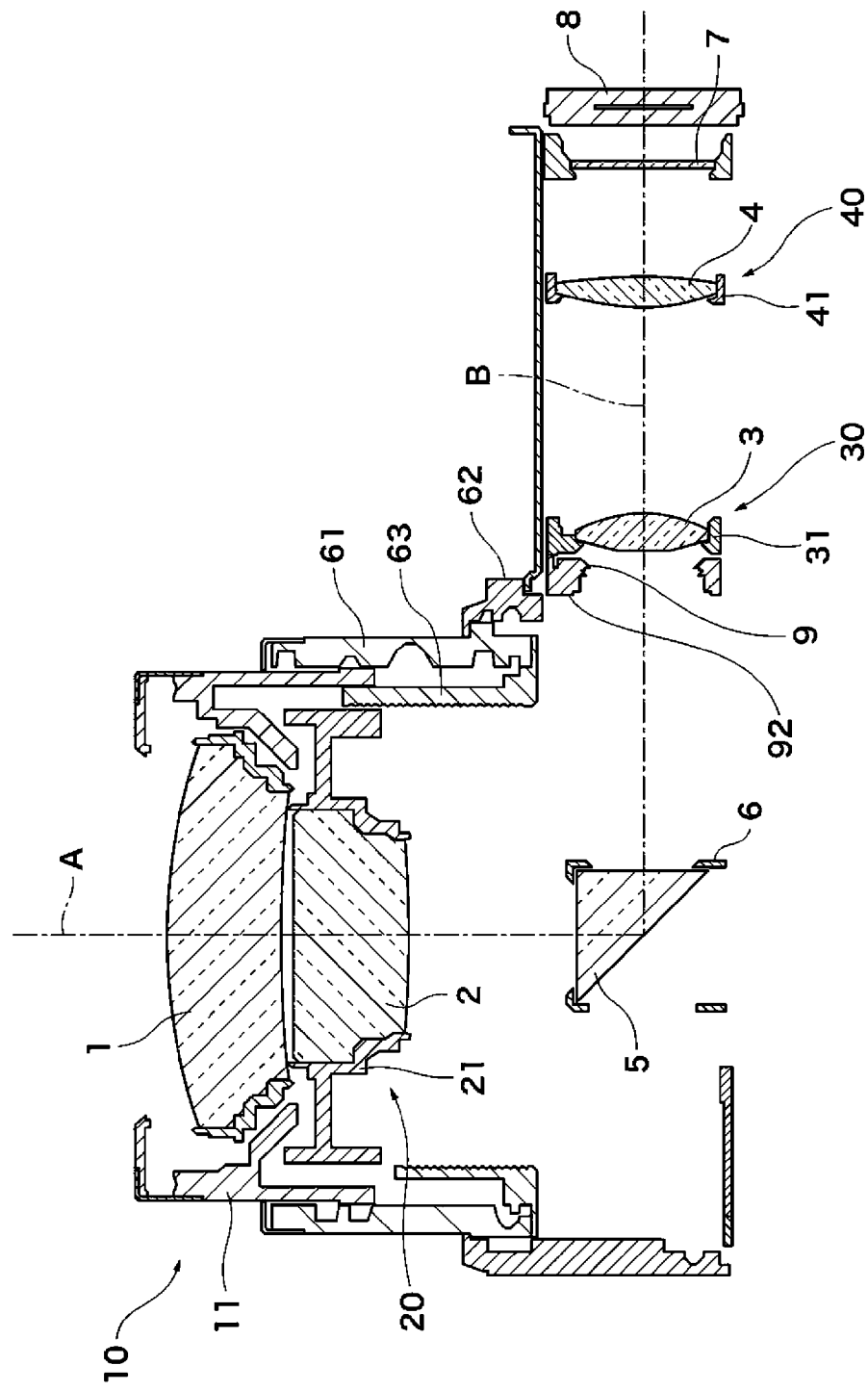
FIG. 1 is a cross-sectional view of essential parts of a digital camera as an image pickup apparatus according to an embodiment of the present invention, in a state where a lens barrel of the digital camera is in a wide-angle position.
Figure 2:
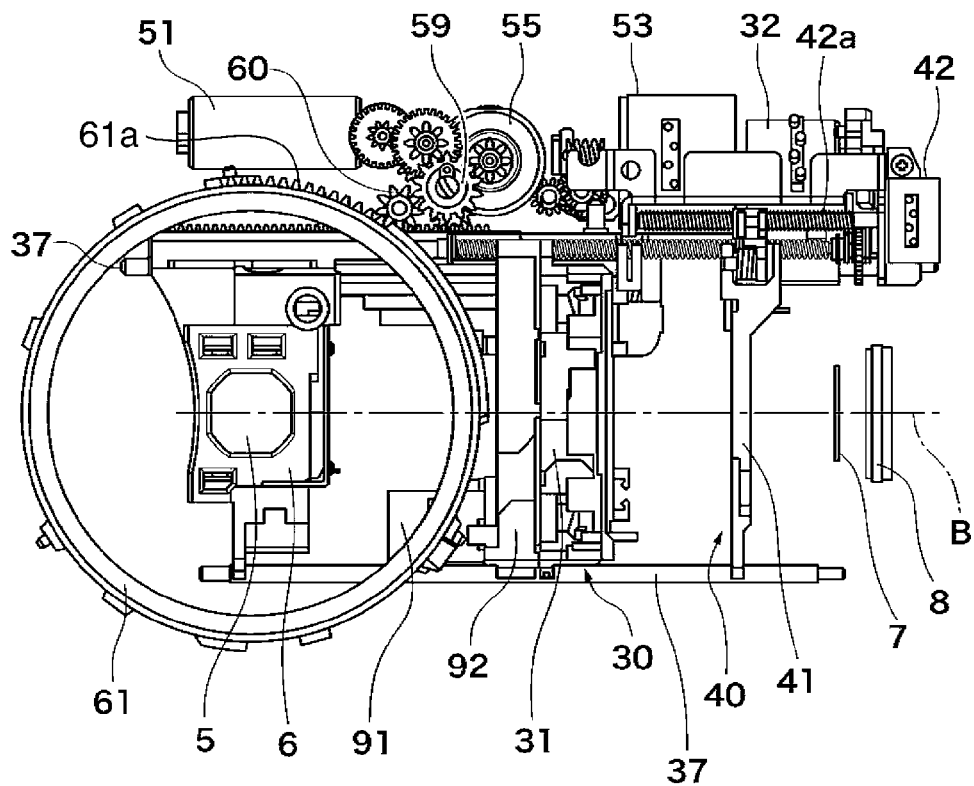
FIG. 2 is a front view of the essential parts in FIG. 1, as viewed from a direction of an optical axis of a first lens group.

FIG. 1 is a cross-sectional view of essential parts of a digital camera as an image pickup apparatus according to an embodiment of the present invention, in a state where a lens barrel of the digital camera is in a wide-angle position. FIG. 2 is a front view of the essential parts in FIG. 1, as viewed from the direction of the optical axis of a first lens group. The lens barrel is of a zoom type which moves between a collapsed position and a shooting position in the optical axis direction to change a photographing magnification.

As shown in FIGS. 1 and 2, the digital camera according to the present embodiment includes the first lens group 10, a second lens group 20, a prism 5, a fixed barrel 62, a cam barrel 61, and a rectilinear motion guide barrel 63. In FIG. 2, the first lens group 10, the second lens group 20, the fixed barrel 62, and the rectilinear motion guide barrel 63 are omitted from illustration.

The first lens group 10 includes a first group lens 1 and a first group barrel 11 holding the first group lens 1, and the second lens group 20 includes a second group lens 2 and a second group barrel 21 holding the second group lens 2. A light beam incident from the first group lens 1 and the second group lens 2 is bent through an angle of substantially 90 degrees by the prism 5 in the direction of an optical axis B intersecting with an optical axis A of the first group lens 1 and the second group lens 2, and is guided to the image-forming plane of an image pickup element 8. The prism 5 is held by a holding member 6 in a manner movable in the direction of the optical axis B. Here, the optical axis A corresponds to an example of a first optical axis in the present invention, and the optical axis B corresponds to an example of a second optical axis in the present invention.

Between the prism 5 and the image pickup element 8, there are disposed a diaphragm-shutter element 9 for controlling the amount of shooting light, a third group lens 3, a fourth group lens 4, and an optical filter 7 in the mentioned order in the direction of the optical axis B from the prism 5 toward the image pickup element 8.

The diaphragm-shutter element 9 is fixed to a shutter base plate 92, the third group lens 3 is held by a third group base plate 31, and the third group base plate 31 and the shutter base plate 92 are connected to each other e.g. with screws, for being integrally combined with each other, whereby a third lens group 30 is constructed. Driving of a stepping motor 32 causes the third lens group 30 to advance and retreat in the direction of the optical axis B to thereby perform a magnification operation. Here, the diaphragm-shutter element 9 corresponds to an example of an optical system element in the present invention.

Figure 3:
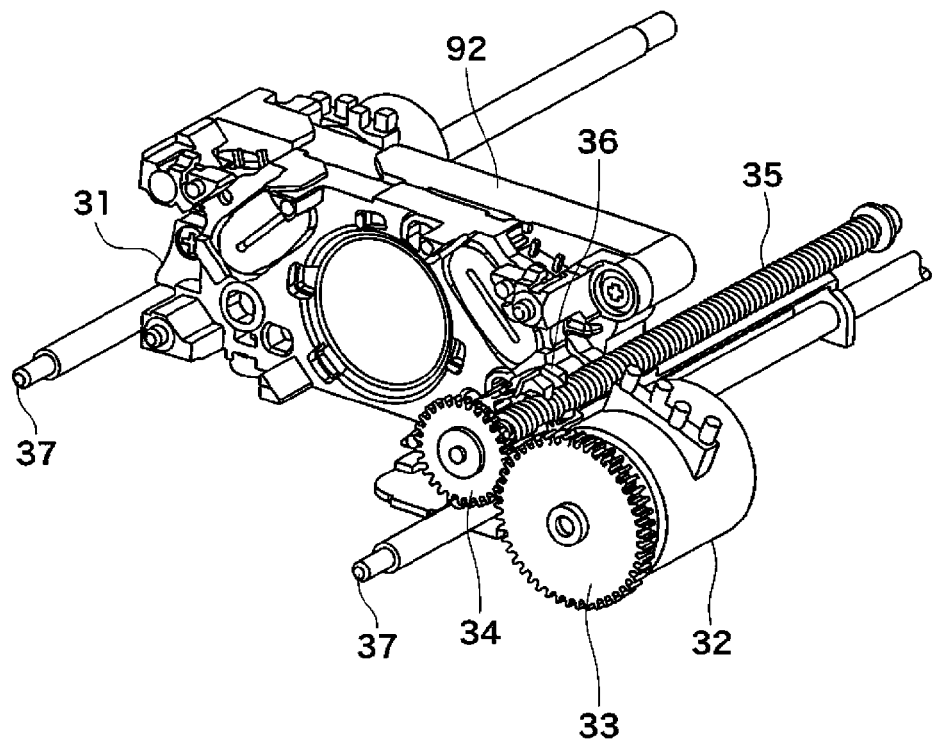
FIG. 3 is a perspective view useful in explaining a drive mechanism for driving a third lens group.

FIG. 3 is a perspective view useful in explaining a drive mechanism for driving the third lens group 30. As shown in FIG. 3, a gear 33 is mounted on an output shaft of the stepping motor 32. The gear 33 meshes with a gear 34 to increase the rotational speed of a screw 35. A rack 36 mounted on the third group base plate 31 meshes with the screw 35, and the third group base plate 31 is supported by two guide bars 37 parallel to the optical axis B in a manner movable in the direction of the optical axis B. Therefore, the rotation of the screw 35 forces the rack 36 to be moved in the direction of the optical axis B, whereby the third lens group 30 is moved along with the rack 36 in the direction of the optical axis B.

Figure 4:
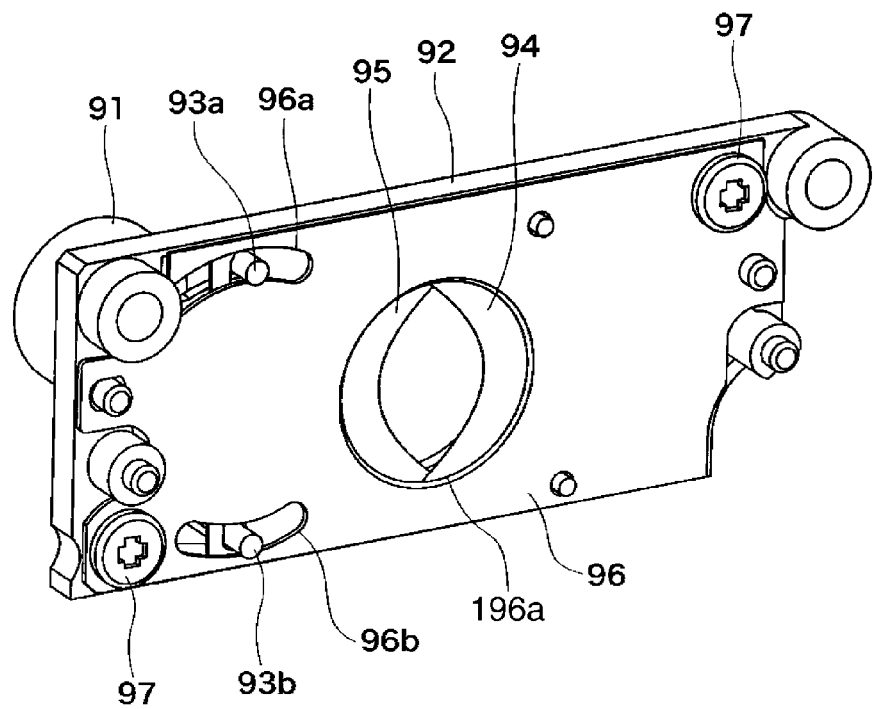
FIG. 4 is a perspective view of a diaphragm-shutter element.
Figure 5:
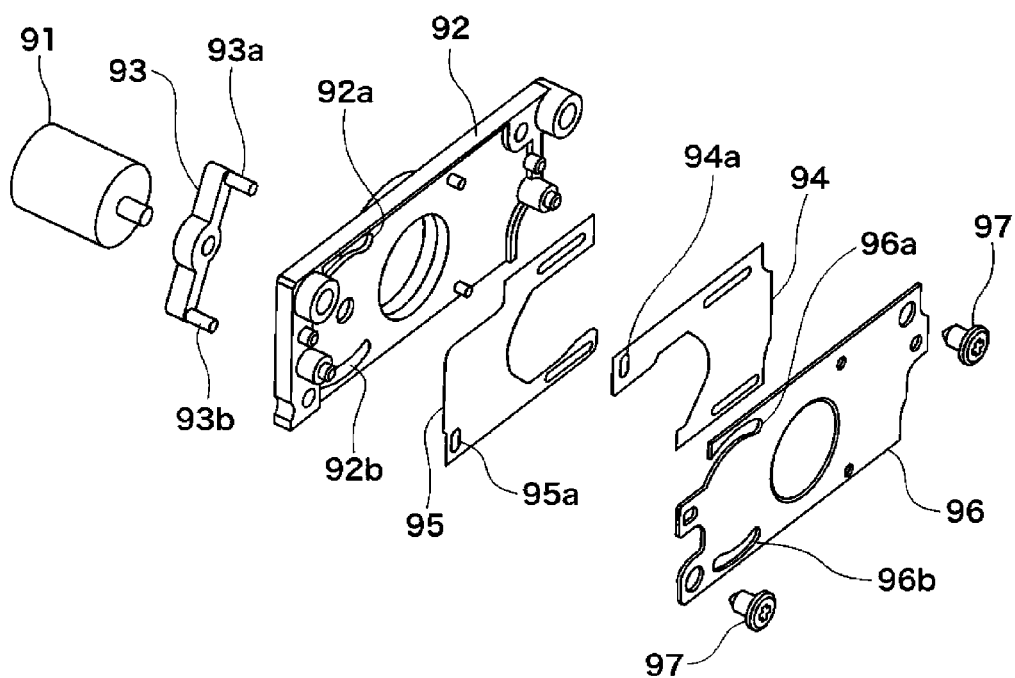
FIG. 5 is an exploded perspective view of the diaphragm-shutter element.

FIG. 4 is a perspective view of the diaphragm-shutter element 9, and FIG. 5 is an exploded perspective view of the diaphragm-shutter element 9. As shown in FIGS. 4 and 5, the diaphragm-shutter element 9 includes a plurality of blades 94 and 95 for opening and closing an opening 196a, which are arranged between the shutter base plate 92 and a cover 96 disposed toward the third group base plate 31. The cover 96 and the shutter base plate 92 are fixed to each other with screws 97.

A stepping motor 91 is an actuator for opening and closing the blades 94 and 95 of the diaphragm-shutter element 9. A lever 93 extending in a direction orthogonal to the axis of the motor shaft of the stepping motor 91 is mounted on the motor shaft. Shafts 93a and 93b are formed on opposite ends of the lever 93 in the direction of extension of the lever 93 such that the shafts 93a and 93b protrude therefrom.

The shaft 93a is inserted into an arcuate hole 92a formed in the shutter base plate 92, a slot 94a formed in the blade 94, and an arcuate hole 96a formed in the cover 96, in a manner movable along the arcuate holes 92a and 96a. Further, the shaft 93b is inserted into an arcuate hole 92b formed in the shutter base plate 92, a slot 95a formed in the blade 95, and an arcuate hole 96b formed in the cover 96, in a manner movable along the arcuate holes 92b and 96b.

When the lever 93 is rotated by driving of the stepping motor 91, the blades 94 and 95 are pivotally moved in the respective opposite directions. The reciprocating pivotal motion of the blades 94 and 95 opens and closes the opening 196a. Thus, a diaphragm function for controlling the amount of shooting light is realized by adjusting a gap between the blades 94 and 95 for opening and closing the opening 196a, and a shutter function is realized by moving the blades 94 and 95 to bring the opening 196a from an open state to a closed state thereof.

Referring again to FIGS. 1 and 2, the fourth group lens 4 is held by a fourth group lens holder 41, to form a fourth lens group 40. Driving of a stepping motor 42 causes rotation of a screw 42a to advance and retreat the fourth lens group 40 in the direction of the optical axis B, whereby a magnification operation and a focusing operation are performed. The optical filter 7 has a low-pass filter function for cutting off light with high spatial frequency and a function for cutting off infrared light.

Figure 6:
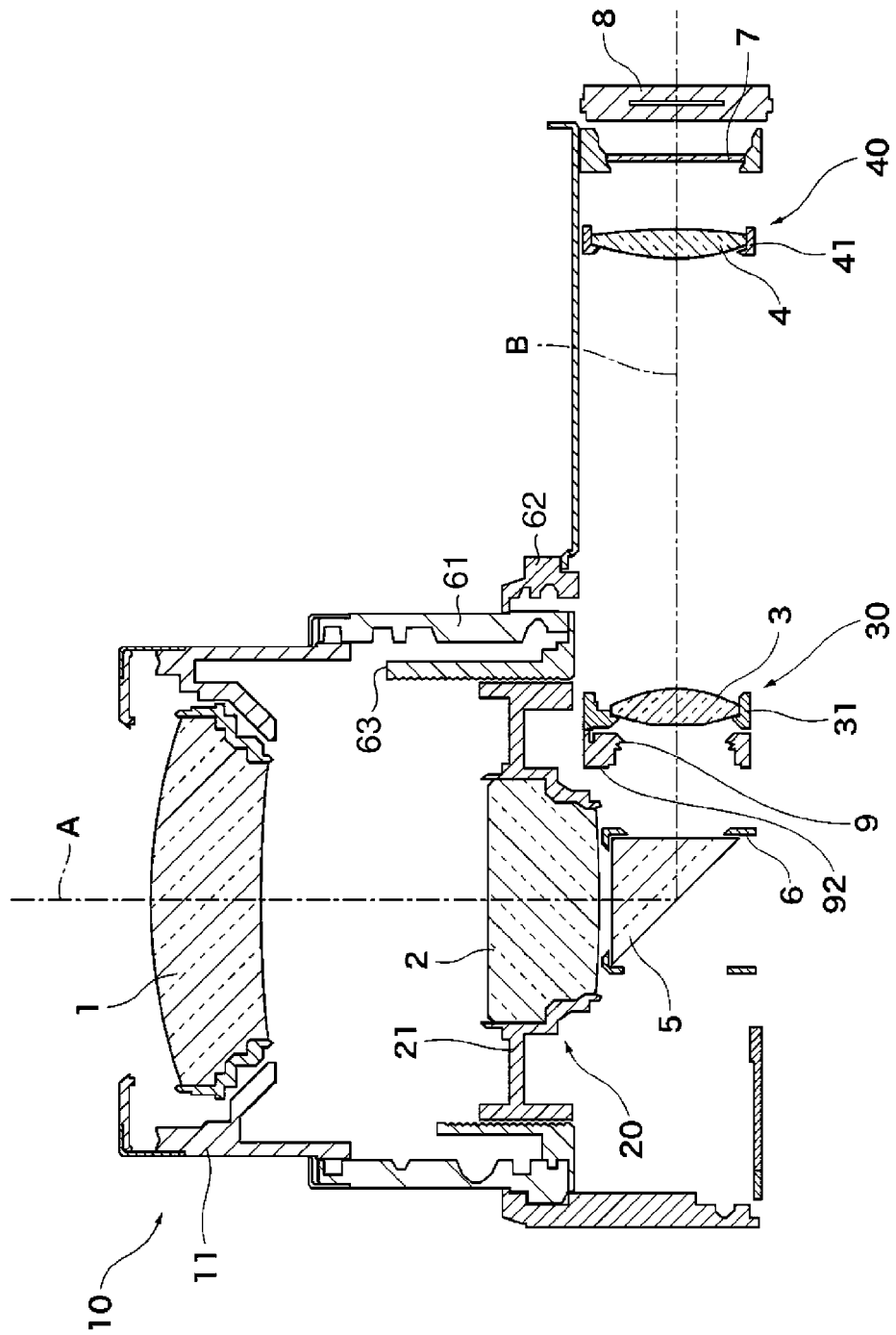
FIG. 6 is a cross-sectional view of the essential parts of the digital camera in a state where the lens barrel is in a telephoto position.
Figure 7:
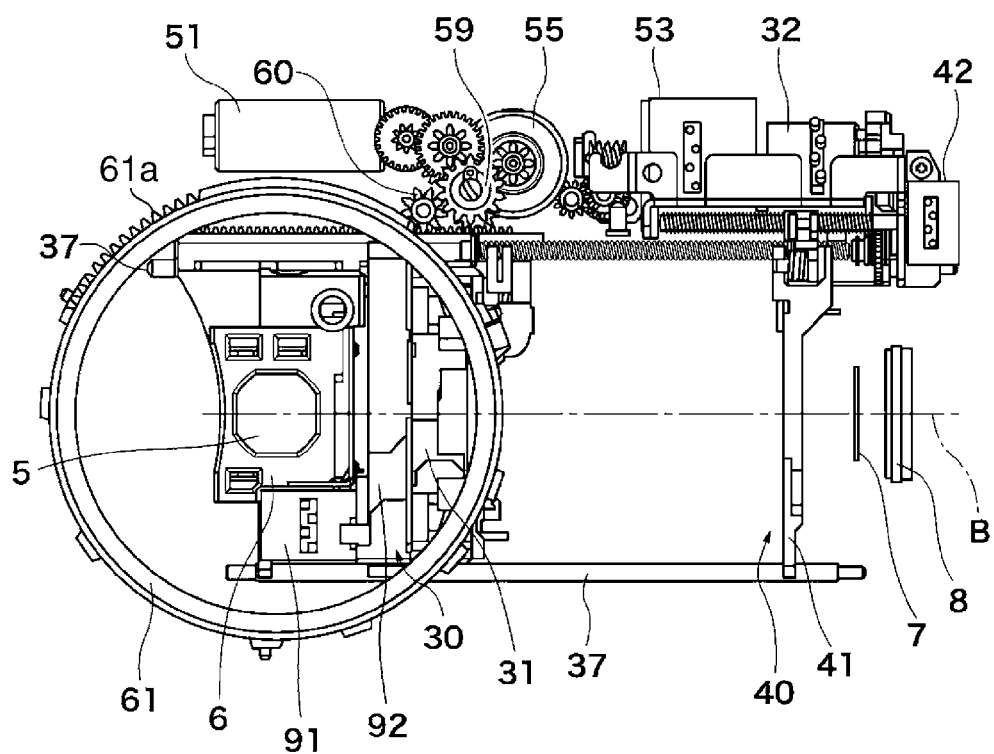
FIG. 7 is a front view of the essential parts in FIG. 6, as viewed from the direction of the optical axis of the first lens group.

FIG. 6 is a cross-sectional view of essential parts of the digital camera in a state where the lens barrel is in a telephoto position, and FIG. 7 is a front view of the essential parts in FIG. 6, as viewed from the direction of the optical axis of the first lens group. In FIG. 7, the first lens group 10, the second lens group 20, the fixed barrel 62, and the rectilinear motion guide barrel 63 are omitted from illustration.

As shown in FIGS. 6 and 7, in the state where the lens barrel is in the telephoto position, the first lens group 10 is in a position advanced toward an object in the direction of the optical axis A, and the second lens group 20 is in a position retreated in the direction of the optical axis A and stopped close to the prism 5. Driving of the stepping motor 32 causes the third lens group 30 to move toward the prism 5 in the direction of the optical axis B, and the third lens group 30 is stopped at a position close to the prism 5.

At this time, as shown in FIG. 7, the stepping motor 91 for opening and closing the blades 94 and 95 of the diaphragm-shutter element 9 is disposed at a location below the prism 5 where the whole range of the stepping motor 91 overlaps the prism 5 in parallel to the optical axis B, such that the position of the stepping motor 91 coincides with the position of the prism 5 in the direction of the optical axis B. Driving of the stepping motor 42 causes the fourth lens group 40 to move toward the image pickup element 8 in the direction of the optical axis B, and the fourth lens group 40 is stopped at a position close to the image pickup element 8.

Figure 8:
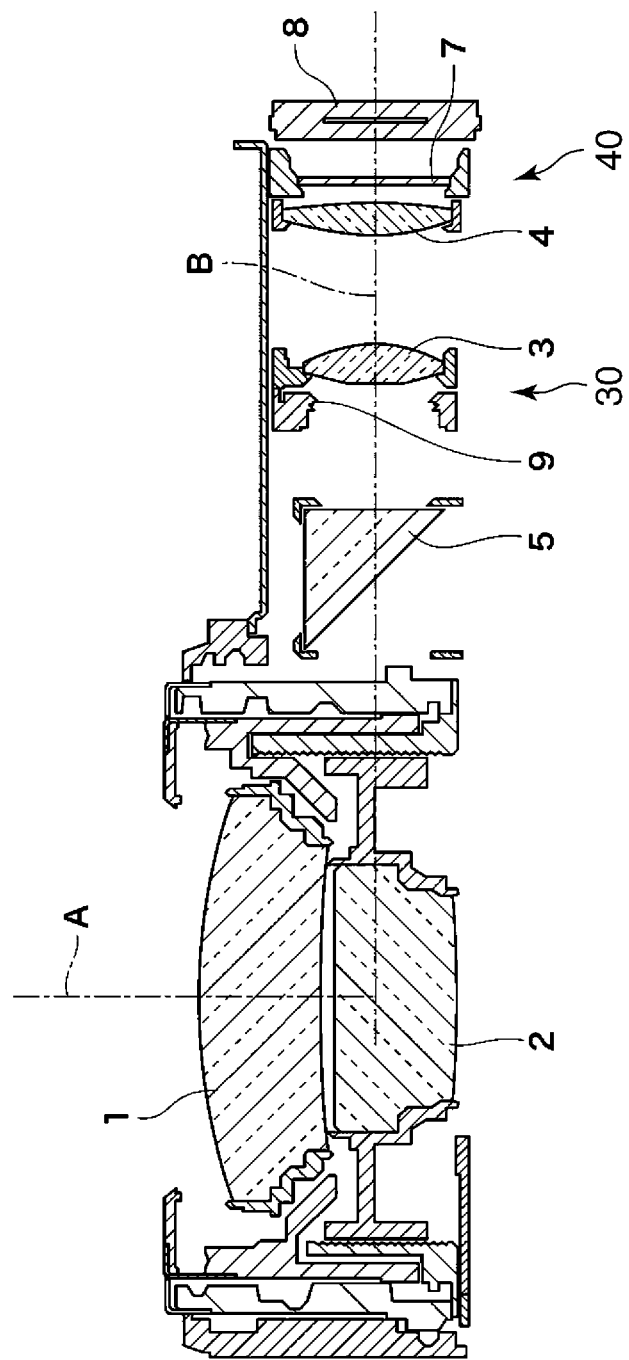
FIG. 8 is a cross-sectional view of the essential parts of the digital camera in a state where the lens barrel is in a sink position (collapsed position).
Figure 9:
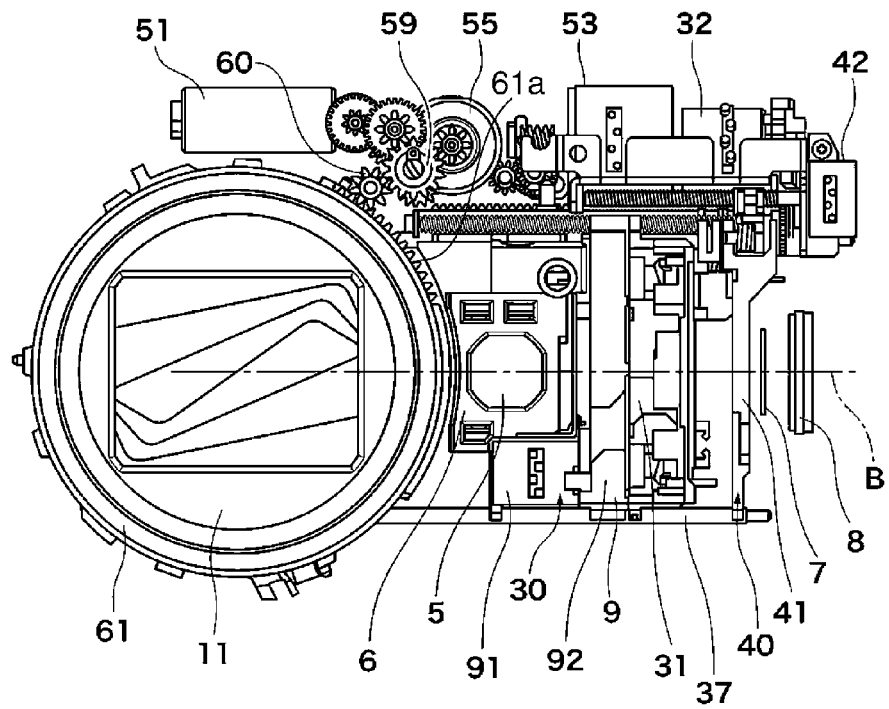
FIG. 9 is a front view of the essential parts in FIG. 8, as viewed from the direction of the optical axis of the first lens group.

FIG. 8 is a cross-sectional view of essential parts of the digital camera in a state where the lens barrel is in a sink position (collapsed position). FIG. 9 is a front view of the essential parts in FIG. 8, as viewed from the direction of the optical axis of the first lens group. As shown in FIGS. 8 and 9, in the state where the lens barrel is in the sink position, the prism 5, the third lens group 30 and the fourth lens group 40 are in respective positions moved in the direction of the optical axis B toward the image pickup element 8 such that they do not interfere with each other. As a consequence, an accommodation space for accommodating the second lens group 20 and the first lens group 10 is formed rearward of the second lens group 20 and the first lens group 10, and the second lens group 20 and the first lens group 10 are retreated in the direction of the optical axis A and are retracted in the accommodation space.

At this time, as shown in FIG. 9, the stepping motor 91 for opening and closing the blades 94 and 95 of the diaphragm-shutter element 9 is disposed at a location below the prism 5 where the whole range of the stepping motor 91 overlaps the prism 5 in parallel to the optical axis B, such that the position of the stepping motor 91 coincides with the position of the prism 5 in the direction of the optical axis B.

Next, a description will be given of the fixed barrel 62, the cam barrel 61 and the rectilinear motion guide barrel 63. A plurality of cam grooves 62a (see FIG. 12) with which cam pins (not shown) provided on an outer periphery of the cam barrel 61 are cam-engaged are formed in an inner periphery of the fixed barrel 62, at approximately equally-spaced intervals in a circumferential direction of the fixed barrel 62. A gear portion 61a (see FIGS. 7 and 9) in mesh with a drive gear 60, described hereinafter, is formed on the outer peripheral surface of the cam barrel 61 such that when a driving force transmitted from the drive gear 60 causes the cam barrel 61 to be driven for rotation. At this time, the cam action between the cam grooves 62a of the fixed barrel 62 and the cam pins of the cam barrel 61 causes the cam barrel 61 to advance or retreat in the direction of the optical axis A. Further, a first group cam groove and a second group cam groove, none of which are shown, are formed in the inner periphery of the cam barrel 61.

The rectilinear motion guide barrel 63 is disposed inside the cam barrel 61 in a manner rotatable in unison with the cam barrel 61 and at the same time movable in the direction of the optical axis A. The first group barrel 11 of the first lens group 10 is disposed between the cam barrel 61 and the rectilinear motion guide barrel 63, and a cam pin provided on an outer peripheral surface of the first group barrel 11 of the first lens group 10 is cam-engaged with the first group cam groove of the cam barrel 61. Further, a rectilinear motion groove (not shown) extending along the direction of the optical axis A is formed in an outer periphery of the rectilinear motion guide barrel 63. A protrusion formed on an inner periphery of the first group barrel 11 is engaged with the rectilinear motion groove, whereby the motion of the first group barrel 11 in the direction of rotation thereof is restricted.

The second lens group 20 is disposed inside the rectilinear motion guide barrel 63. Similarly to the first lens group 10, a cam pin (not shown) provided on an outer periphery of the second group barrel 21 of the second lens group 20 is cam-engaged with the second group cam groove of the cam barrel 61. Further, a through groove (not shown) is formed in the rectilinear motion guide barrel 63 in the direction of the optical axis A. An engagement portion (not shown) disposed at a root of the cam pin of the second group barrel 21 is engaged with the through groove, whereby the motion of the second group barrel 21 in the direction of rotation thereof is restricted.

When the cam barrel 61 rotates, the cam action between the first group cam groove of the cam barrel 61 and the cam pin of the first group barrel 11 causes the first group barrel 11 to advance or retreat relative to the cam barrel 61 in the direction of the optical axis A, while causing the protrusion of the first group barrel 11 to slide along the rectilinear motion groove of the rectilinear motion guide barrel 63 in the direction of the optical axis A. Therefore, when the cam barrel 61 advances or retreats relative to the fixed barrel 62 in the direction of the optical axis A, the first group barrel 11 advances or retreats relative to the cam barrel 61 in the direction of the optical axis A, whereby the first group lens 1 is moved between the collapsed position and the shooting position. The second group lens 2 is also moved between the collapsed position and the shooting position by the same operation.

Figure 10:
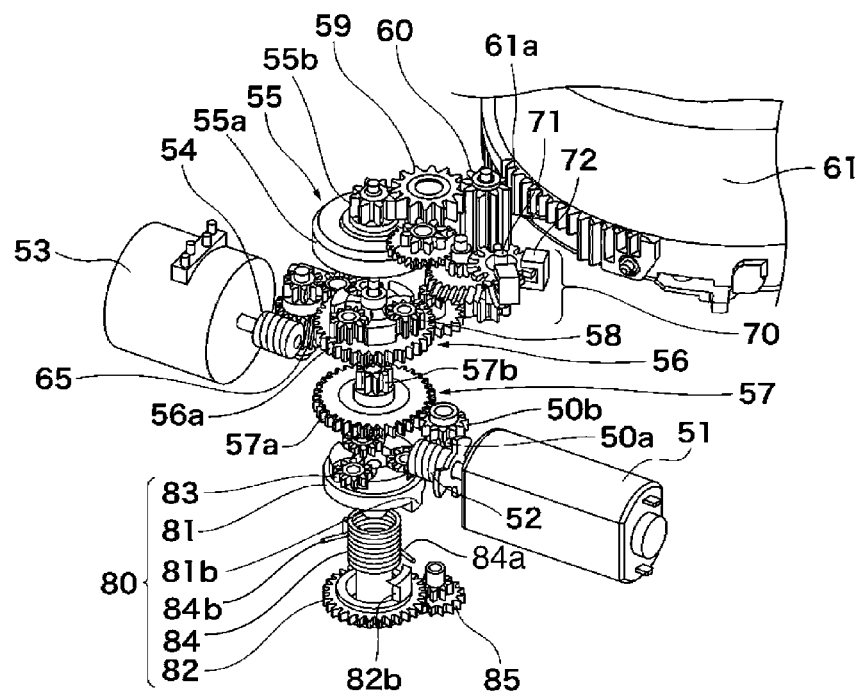
FIG. 10 is an exploded perspective view of part of a drive mechanism for driving a cam barrel and a prism.

Next, a drive mechanism for the cam barrel 61 and the prism 5 will be described with reference to FIGS. 10 to 14. FIG. 10 is an exploded perspective view of part of the drive mechanism for driving the cam barrel 61 and the prism 5. FIG. 14 is a perspective view, partly in cross-section, of part of the drive mechanism for driving the cam barrel 61 and the prism 5.

In FIGS. 10 and 14, reference numeral 51 denotes a SW (sink-wide) motor which is a drive source for moving the first lens group 10 and the second lens group 20 between the sink position and the wide-angle position. Reference numeral 53 denotes a TW (telephoto-wide) motor which is a drive source for moving the first lens group 10 and the second lens group 20 between the telephoto position and the wide-angle position. The SW motor 51 and the TW motor 53 are arranged such that motor axes thereof extend in the direction of the optical axis B. Further, the TW motor 53 is positioned closer to an object than the SW motor 51. A worm gear 52 is press-fitted on the motor shaft of the SW motor 51, and a worm gear 54 is press-fitted on the motor shaft of the TW motor 53.

A zoom ring gear 55, a zoom carrier gear 56 and a sun gear 57 are coaxially arranged between the worm gear 52 and the worm gear 54 in parallel with the optical axis A in the mentioned order from the object side (upper side as viewed in FIGS. 10 and 14).

The sun gear 57 includes sun gears 57a to 57c formed by respective flat gears in three steps, and a flat gear 50b in mesh with the sun gear 57a meshes with the worm gear 52 via a helical gear 50a.

The zoom carrier gear 56 has a gear portion 56a and three shafts protruding from a surface of the gear portion 56a facing toward the object side at approximately equally-spaced intervals in the circumferential direction. Zoom planetary gears 58 are rotatably supported on the three shafts, respectively. Further, the worm gear 54 is configured to mesh with the gear portion 56a e.g. via a helical gear 65, and the zoom planetary gears 58 are configured to mesh with the sun gear 57b. The zoom ring gear 55 includes an internal gear 55a and an external gear 55b. The zoom planetary gears 58 mesh with the internal gear 55a, the external gear 55b meshes with the drive gear 60 via an idler gear 59, and the drive gear 60 meshes with the gear portion 61a of the cam barrel 61.

Next a description will be given of a prism drive section 80. In the prism drive section 80, a prism carrier 81, a torsion spring 84 and a prism delay gear 82 are arranged coaxially with the sun gear 57 below the sun gear 57 in the mentioned order from the object side. The prism delay gear 82 is rotatably supported by the prism carrier 81.

The prism carrier 81 has three shafts protruding from a surface thereof facing toward the object side at approximately equally-spaced intervals in the circumferential direction. Prism planetary gears 83 are rotatably supported on the three shafts, respectively. The prism planetary gears 83 are configured to mesh with the sun gear 57c and an internal gear (not shown) fixed to a gear base plate (not shown).

A prism drive gear 85 meshes with a gear portion of the prism delay gear 82. A hook 81b and a hook 82b are formed on the prism carrier 81 and prism delay gear 82, respectively, in a manner extending in directions opposed to each other. The hook 81b is disposed radially inward of the hook 82b (see FIGS. 13A to 13C).

The torsion spring 84 includes a coil and two arms 84a and 84b extending radially outward from axially opposite ends of the coil. The arms 84a and 84b are hooked on the respective hooks 82b and 81b of the prism delay gear 82 and prism carrier 81. When integrated into the prism drive section 80, the torsion spring 84 is preloaded with the two arms 84a and 84b hooked on the hooks 82b and 81b in a state where the hook 82b and the hook 81b are arranged in the same phase (see FIG. 13B).

In this state, when the prism carrier 81 is rotated with the prism delay gear 82 made rotatable, the prism carrier 81, the prism delay gear 82 and the torsion spring 84 rotate in unison with each other. On the other hand, when the prism carrier 81 is rotated with the prism delay gear 82 restricted from rotation, only the prism carrier 81 rotates while increasing the torsional load of the torsion spring 84.

Figure 11:
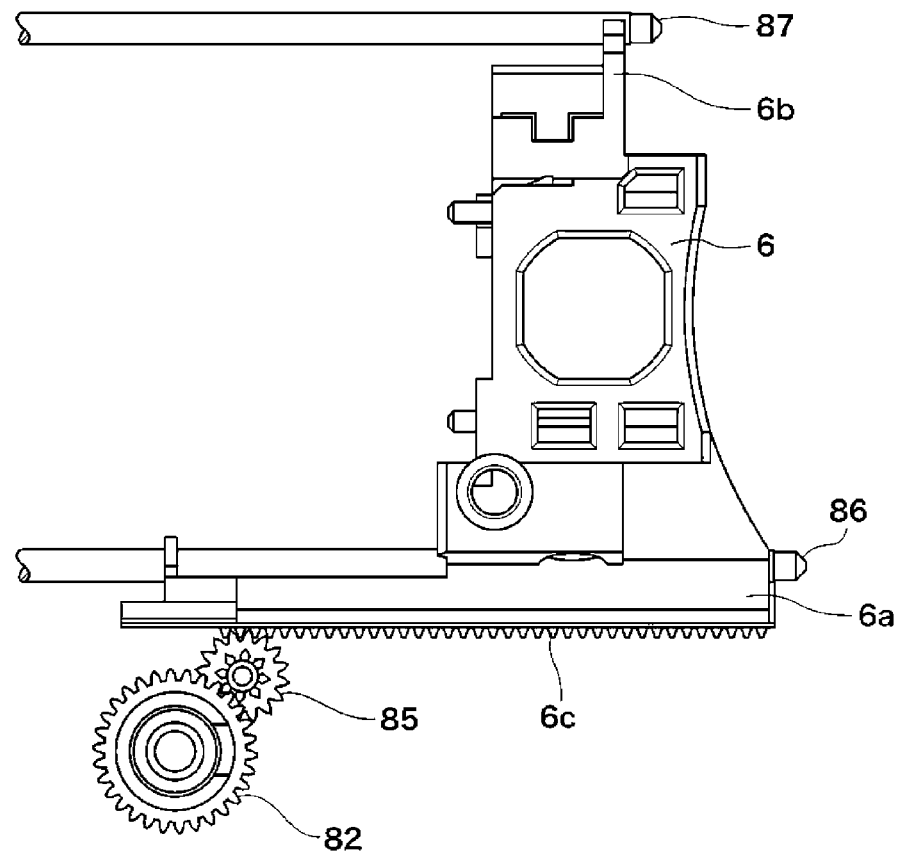
FIG. 11 is a plan view of a holding member for holding the prism and part of a prism drive section.

FIG. 11 is a plan view of the holding member 6 for holding the prism 5 and part of the prism drive section 80.

As shown in FIG. 11, the holding member 6 is formed with engagement portions 6a and 6b which are movably engaged with two guide shafts 86 and 87 arranged in parallel with each other and extending in the direction of the optical axis B. The engagement portion 6a is formed with a rack gear 6c. The rack gear 6c meshes with the prism drive gear 85. Therefore, when the prism drive gear 85 rotates, the holding member 6 is advanced or retreated in the direction of the optical axis B in unison with the prism 5.

Next, referring again to FIG. 10, a description will be given of the operation of the cam barrel 61 and the prism 5.

In a case where the SW motor 51 is driven but the TW motor 53 is stopped, a driving force is transmitted from the SW motor 51 to the sun gear 57 to rotate the sun gear 57, but the zoom carrier gear 56 connected to the TW motor 53 remains at rest. As a consequence, the zoom planetary gears 58 do not revolve around the sun gear 57 but each only rotate about its own rotational axis.

For example, assuming that the number of teeth of the sun gear 57 is 9, the number of teeth of each zoom planetary gear 58 is 10, and the number of teeth of the internal gear 55a of the zoom ring gear 55 is 30, the rotation of the sun gear 57 is transmitted to the zoom ring gear 55 after having its speed reduced 1/3.33 times. Then, the rotation of the external gear 55b is transmitted to the drive gear 60 via the idler gear 59, and the rotation of the drive gear 60 is transmitted to the gear portion 61a of the cam barrel 61, whereby the cam barrel 61 is driven for rotation.

The direction of rotation of the zoom ring gear 55 becomes opposite to the direction of rotation of the sun gear 57, and at this time the rotation of the sun gear 57 is transmitted to the prism carrier 81 via the prism planetary gears 83. Here, if the holding member 6 is movable in the direction of the optical axis B, the torsion spring 84 and the prism delay gear 82 rotate in unison with the prism carrier 81 to thereby cause the holding member 6 to advance or retract in the direction of the optical axis B. On the other hand, if the motion of the holding member 6 in the direction of the optical axis B is restricted, the prism delay gear 82 cannot rotate, either, and hence the torsion spring 84 absorbs the rotation of the prism carrier 81 while having the torsional load thereof being increased.

In a case where the SW motor 51 is stopped but the TW motor 53 is driven, the sun gear 57 connected to the SW motor 51 is stopped, and the zoom carrier gear 56 connected to the TW motor 53 rotates. This causes the zoom planetary gears 58 to rotate and revolve. For example, assuming that the number of teeth of the sun gear 57 is 9, the number of teeth of the zoom planetary gear 58 is 10, and the number of teeth of the internal gear 55a of the zoom ring gear 55 is 30, the rotation of the zoom carrier gear 56 is transmitted to the zoom ring gear 55 after having its speed increased 1.3 times, to thereby drive the cam barrel 61 for rotation.

In this case, the direction of rotation of the zoom ring gear 55 becomes the same as the direction of rotation of the zoom carrier gear 56. At this time, since the sun gear 57 is stopped, the prism carrier 81 is also stopped, so that the driving force is not transmitted to the holding member 6.

In a case where the SW motor 51 and the TW motor 53 are driven at the same time, the rotation having a rotational speed resulting from combination of the respective rotations caused by the two motors 51 and 53 is transmitted to the zoom ring gear 55. For example, let it be assumed that the sun gear 57 and the zoom carrier gear 56 are rotated clockwise at 1 rpm. A rotational speed to be transmitted to the zoom ring gear 55 by the sun gear 57 is 0.3 rpm counterclockwise, and a rotational speed to be transmitted to the zoom ring gear 55 by the zoom carrier gear 56 is 1.3 rpm clockwise. Therefore, the zoom ring gear 55 rotates clockwise at 1 rpm obtained by combining these two rotational speeds.

Now, let it be assumed that the sun gear 57 is rotated clockwise at 1.3 rpm, and the zoom carrier gear 56 is rotated clockwise at 0.3 rpm. The rotational speed to be transmitted to the zoom ring gear 55 by the sun gear 57 is 0.39 rpm counterclockwise, and the rotational speed to be transmitted to the zoom ring gear 55 by the zoom carrier gear 56 is 0.39 rpm clockwise. By combining these two rotational speeds, the zoom ring gear 55 is caused to be at rest.

From the above description, it is understood that if the rotational speeds and the rotational directions of the SW motor 51 and the TW motor 53 are properly selected, it is possible to drive the prism 5 in a state in which the cam barrel 61 is stopped. Further, it is understood that the reduction ratio of a gear train connected to the SW motor 51 is large, whereas the reduction ratio of a gear train connected to the TW motor 53 is small. This point will be described hereinafter.

Next, an operation for advancing the first lens group 10 and the second lens group 20 in the direction of the optical axis A to thereby dispose the prism 5 in a shooting position will be described with reference to FIG. 12 and FIGS. 13A to 13C.

Figure 12:
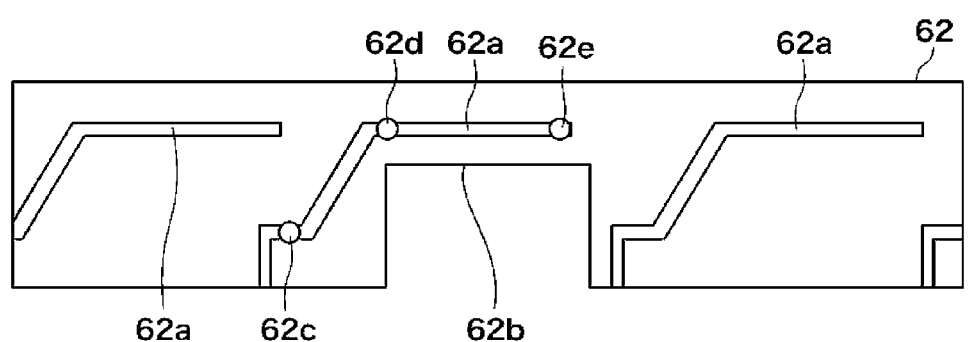
FIG. 12 is an unfolded view of an inner periphery of a fixed barrel.

FIG. 12 is an unfolded view of the inner periphery of the fixed barrel 62. Referring to FIG. 12, the cam grooves 62a with which the cam pins provided on the outer peripheral surface of the cam barrel 61 are cam-engaged are formed in the inner periphery of the fixed barrel 62, at approximately equally-spaced intervals in the circumferential direction of the fixed barrel 62. Further, a cutout 62b through which the holding member 6 for holding the prism 5 passes when advancing or retreating in the direction of the optical axis B is formed in a rear end of the fixed barrel 62.

Figure 13A:
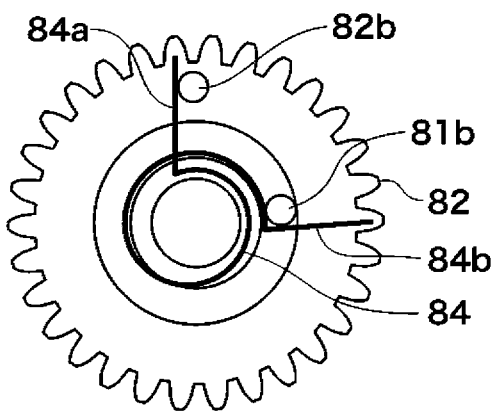
FIGS. 13A to 13c are diagrams useful in explaining the phase relationship between a prism carrier and a prism delay gear, and an amount of torsional load of a torsion spring.
Figure 13B:
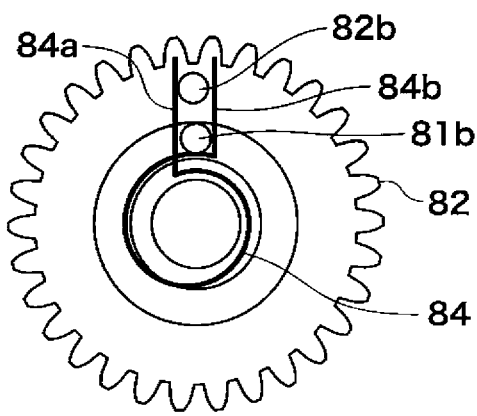
Figure 13C:
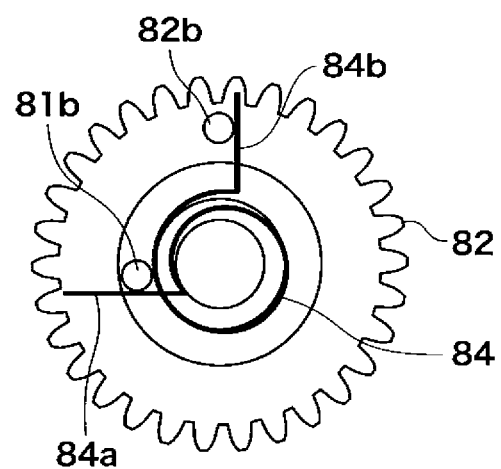
Figure 14:
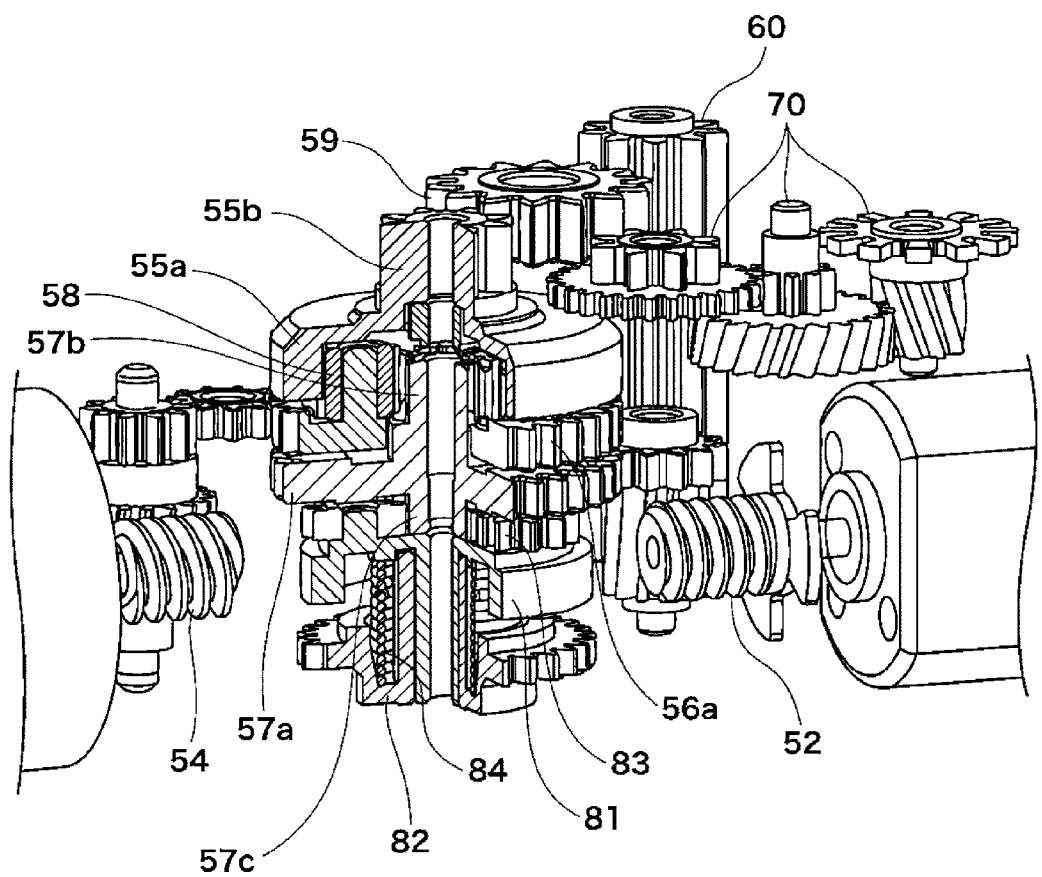
FIG. 14 is a perspective view, partly in cross-section, of part of the drive mechanism for driving the cam barrel and the prism.

FIGS. 13A to 13c are diagrams useful in explaining the phase relationship between the prism carrier 81 and the prism delay gear 82, and the amount of torsional load on the torsion spring 84.

When the lens barrel is in the sink position, each cam pin of the cam barrel 61 is disposed at a position 62c, indicated in FIG. 12, in an associated one of the cam grooves 62a of the fixed barrel 62. At this time, the prism carrier 81 and the prism delay gear 82 are in a phase relationship where the torsion spring 84 has its torsional load increased, as shown in FIG. 13A. Although in this state, the holding member 6 is urged in a retracting direction of the optical axis B (toward the image pickup element 8) by the torsional load on the torsion spring 84, the motion thereof in the retracting direction is restricted by a mechanical end, not shown.

To place the lens barrel in a shooting-ready state, first, the SW motor 51 is rotated in a direction of advancing (moving forward) the cam barrel 61. At this time, the cam pins of the cam barrel 61 are moved toward the right, as viewed in FIG. 12, along the cam grooves 62a of the fixed barrel 62, and the first lens group 10 and the second lens group 20 are moved in the advancing direction of the cam barrel 61 along the optical axis A in a section where lift is permitted. During the advancing operation, the prism carrier 81 as well rotates in the direction in which the holding member 6 is advanced to the shooting position, but the torsion spring 84 has an increased torsional load, which causes the prism delay gear 82 to remain at rest. Therefore, the holding member 6 is not moved from its retracted position.

When the cam barrel 61 is moved in the direction of the optical axis A to create a space where the holding member 6 can be moved toward the shooting position, as shown in FIG. 13B, the phase of the hook 81b of the prism carrier 81 and that of the hook 82b of the prism delay gear 82 come to coincide with each other.

Further, when the SW motor 51 is rotated in the extension direction of the cam barrel 61, the cam pins of the cam barrel 61 are moved toward the right, as viewed in FIG. 12, along the cam groove 62a of the fixed barrel 62, and at the same time the holding member 6 is moved toward the shooting position.

When the cam barrel 61 reaches the wide-angle position, the TW motor 53 is driven in the retracting direction of the cam barrel 61 in a state where the SW motor 51 is driven in the advancing direction of the cam barrel 61. This causes only the holding member 6 to continue to be moved to the shooting position in the direction of the optical axis B in a state where the cam barrel 61 remains at rest at the wide-angle position.

The holding member 6, upon reaching the shooting position, is brought into abutment with a shooting-side stopper (not shown) and stops, and the prism delay gear 82 also stops simultaneously with the stoppage of the holding member 6. At this time, by continuing to drive the SW motor 51 further in the advancing direction of the cam barrel 61, the prism carrier 81 continues to rotate in a direction for advancing the holding member 6 to the shooting position, whereby the torsional load of the torsion spring 84 is increased. By increasing the torsional load on the torsion spring 84 to some extent, the holding member 6 is urged toward the shooting-side stopper by the action of the torsion spring 84, which contributes to stabilization of the position and the attitude of the holding member 6 when shooting is performed.

When the torsion spring 84 reaches a predetermined torsion load-increased state, the SW motor 51 and the TW motor 53 are stopped.

By carrying out the above-described operations, the first lens group 10, the second lens group 20 and the prism 5 are disposed in the wide-angle position, whereby the digital camera is placed in the shooting-ready state. When the cam barrel 61 reaches the wide-angle position, the cam pins are moved to respective positions 62d in the cam grooves 62a of the fixed barrel 62. After that, the third lens group 30 and the fourth lens group 40 are moved to respective predetermined positions along the optical axis B.

In moving the lens barrel from the wide-angle position to the sink position, operations reverse to the above are performed. First, the third lens group 30 and the fourth lens group 40 are caused to retract toward the image pickup element 8 in the direction of the optical axis B. Next, while driving the TW motor 53 in the extension direction of the cam barrel 61, the SW motor 51 is simultaneously driven in the retracting direction of the cam barrel 61, which causes only the prism carrier 81 to rotate in a direction for causing the holding member 6 to move in the direction for retracting the holding member 6 to the retracted position, without causing rotation of the cam barrel 61.

Then, the prism carrier 81 is rotated by an amount corresponding to the aforementioned increase in the torsional load on the torsion spring 84, whereby the phase of the hook 81b of the prism carrier 81 and that of the hook 82b of the prism delay gear 82 come to coincide with each other. At this time, the prism delay gear 82 is rotated in a direction for retracting the holding member 6 to the retracted position in unison with the prism carrier 81 and the torsion spring 84, whereby the holding member 6 is moved in the retracting direction.

When the holding member 6 is moved to the retracted position to thereby create a space which can accommodate the cam barrel 61, at a location rearward of the cam barrel 61, the TW motor 53 is stopped, and only the SW motor 51 continues to be driven in a direction for retracting the cam barrel 61, which causes the cam barrel 61 to start to be retracted. When the holding member 6 is moved to the retracted position, it is brought into abutment with a retraction-side mechanical end (not shown) and is stopped. At the same time, the prism delay gear 82 is also stopped.

Since the SW motor 51 continues to be driven so as to retract the cam barrel 61 to the collapsed position, the prism carrier 81 continues to be rotated in the direction for retracting the holding member 6 to the retracted position while increasing the torsional load on the torsion spring 84. When the cam barrel 61 is retracted in the sink position and the first lens group 10 and the second lens group 20 are retracted, the SW motor 51 is stopped.

In performing the magnification operation between the wide-angle position and the telephoto position of the lens barrel, by driving only the TW motor 53, it is possible to move the first lens group 10 and the second lens group 20 in the direction of the optical axis A without moving the holding member 6 in the direction of the optical axis B. When the lens barrel is in the telephoto position, the cam pins of the cam barrel 61 are disposed at respective positions 62e of the cam grooves 62a of the fixed barrel 62 (see FIG. 12).

Next, a description will be given of advantageous effects provided by the fact that the reduction ratio of the gear train connected to the SW motor 51 is large, and the reduction ratio of the gear train connected to the TW motor 53 is small, as described above.

Normally, the driving load of the cam barrel 61 is larger in a region of each cam groove 62a of the fixed barrel 62 from the sink position to the wide-angle position where the lift angle is large than in a shooting region from the wide-angle position to the telephoto position. Further, in the region from the sink position to the wide-angle region, the operating load of a lens barrier is often added to the driving load of the cam barrel 61, and hence it is necessary to amplify the torque of the motor using the gear train having a larger reduction ratio.

On the other hand, in the shooting region from the wide-angle position to the telephoto position, it is necessary to keep the rotational speed of the motor low so as to prevent lens driving noise from being recorded during moving image shooting and the like. If a gear train having a large reduction ratio is used in this case, the rotational speed of the cam barrel becomes very low.

In the present embodiment, in the region from the sink position to the wide-angle position, in which the load of the cam barrel 61 is large, the driving force of the SW motor 51 is transmitted to the cam barrel 61 via the gear train having a larger reduction ratio to drive the cam barrel 61. Further, in the shooting region from the wide-angle position to the telephoto position, the driving force of the TW motor 53 is transmitted to the cam barrel 61 via the gear train having a smaller reduction ratio to drive the cam barrel 61. This makes it possible to obtain an excellent magnification operation speed even when the TW motor 53 is rotated at a low speed so as to make the motor driving noise smaller during moving image shooting.

Further, in the present embodiment, the SW motor 51 and the TW motor 53 can be realized by respective different types. For example, a DC motor can be used for the SW motor 51, and a stepping motor can be used for the TW motor 53. Since the stepping motor can be more stably controlled at a low speed than the DC motor, the stepping motor is excellent for low-speed driving during moving image shooting.

Further, when the stepping motor is employed, it is possible to select a driving method from micro-step driving, 2-phase excitation driving, and so forth. If the micro-step driving is used, it is possible to perform even quieter driving, while if the 2-phase driving is used, high-torque driving can be performed. Therefore, it is preferable to use the micro-step driving for the magnification operation during moving image shooting which requires quietness, and use the 2-phase driving for the magnification operation during still image shooting.

Further, according to the configuration of the gear trains of the drive mechanism of the present embodiment, whichever of the SW motor 51 and the TW motor 53 may be driven, it is possible to drive the cam barrel 61 in all regions from the sink position to the telephoto position. Therefore, it is possible to selectively use the SW motor 51 and the TW motor 53, by using the SW motor 51 when a high-speed magnification operation is required, and using the TW motor 53 when a low-speed magnification operation is required.

Next, referring again to FIG. 10, a description will be given of a pulse gear train 70 for detecting the positions of the first lens group 10 and the second lens group 20 in the direction of the optical axis A.

As shown in FIG. 10, the pulse gear train 70 is connected to the zoom ring gear 55 and the idler gear 59, which are output gears of a planetary gear train. A pulse plate 71 as a final gear of the pulse gear train 70 is formed with a plurality of blades. The number of times of passing of the blades can be counted by a photo interrupter 72, to thereby detect the amount of rotation of the cam barrel 61. The speed increasing ratio of the pulse gear train 70 and the number of the blades of the pulse plate 71 are determined such that a necessary resolution determined depending on an optical design can be obtained.

Basically, when a gear train is used to transmit the driving force of a motor, no loss of the amount of rotation is caused by slippage, and hence the amount of rotation of the cam barrel with respect to the amount of rotation of the motor is linearly determined by a reduction ratio. But actually, the amount of rotation of the cam barrel with respect to the amount of rotation of the motor varies due to backlash of the gears and a meshing error.

However, in a conventional lens barrel that drives a single cam barrel by a single motor, once a gear train is assembled, the meshing relationship between gears is invariable even when the motor is driven. That is, since the same teeth are in mesh each time, the state of variation in the amount of rotation of the cam barrel with respect to the amount of rotation of the motor is the same each time. Therefore, even if the amount of rotation of the cam barrel is determined based on the amount of rotation of the motor, an error between an amount of rotation of the cam barrel determined by calculation and an actual amount of rotation thereof is small.

In contrast, as in the present embodiment, in a case where a planetary gear train is used to combine the amounts of rotation of two motors to thereby drive a single cam barrel, when one of the motors is rotated, the relationship between the other motor and the teeth of the zoom ring gear 55 is changed.

More specifically, whenever the power of the camera is turned on, different teeth of the gears mesh with each other, so that the state of variation in the amount of rotation of the cam barrel with respect to the amount of rotation of the motor can be different. Therefore, when the amount of rotation of the cam barrel is determined based on the amounts of rotation of the motors, an error between the amount of rotation of the cam barrel determined by calculation and an actual amount of rotation thereof can be increased.

In the present embodiment, however, the pulse gear train 70 is branched from the idler gear 59 between the zoom ring gear 55, which is an output gear of the planetary gear train, and the cam barrel 61, and therefore the meshing relationship between the pulse gear train 70 and the gears of the cam barrel 61 is invariable. This makes it possible to detect the amount of rotation of the cam barrel with an equivalent error to an error caused by the conventional lens barrel.

As described heretofore, in the present embodiment, when the lens barrel is in the telephoto position and the sink position, the stepping motor 91 for driving the diaphragm-shutter element 9 is disposed at a location where the whole range of the stepping motor 91 overlaps the prism 5 in parallel with the optical axis B, such that the position of the stepping motor 91 coincides with the position of the prism 5 in the direction of the optical axis B. That is, a space for accommodating the prism 5 is formed in a space surrounded by the diaphragm-shutter element 9 and the stepping motor 91 that protrudes from the diaphragm-shutter element 9 toward the prism 5 in parallel with the optical axis B, and the prism 5 is accommodated in the accommodation space. This makes it possible to improve, compared with the conventional digital camera, space efficiency for an optical system element disposed in the direction of the optical axis B, thereby making it possible to reduce the size of the digital camera when the lens barrel is retracted.

The configuration of the present invention is not limited to the above-described embodiment, but the materials, shapes, sizes, forms, numbers, and arrangement of the component elements and so forth of the present invention can be modified or altered insofar as they do not depart from the subject matter of the present invention.

Although in the above-described embodiment, the prism 5 is used as a reflective optical element, by way of example, a mirror or the like may be used, for example.

Further, although in the above-described embodiment, the prism 5 and the stepping motor 91 for driving the diaphragm-shutter element 9 overlap each other in parallel with the optical axis B, by way of example, this is not limitative, but the stepping motor 32 for driving the third lens group 30 and the stepping motor 42 for driving the fourth lens group 40 may be configured to be movable in the direction of the optical axis B such that they overlap the prism 5 at least in the sink position in parallel with the optical axis B. Further, a stepping motor for driving only a diaphragm or only a shutter may be configured to be movable in the direction of the optical axis B such that it overlaps the prism 5 in parallel with the optical axis B at least in the sink position.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2010-147604 filed Jun. 29, 2010, which is hereby incorporated by reference herein in its entirety.

What is claimed is:

1. An image pickup apparatus including a zoom lens barrel that moves between a collapsed position and a shooting position in an optical axis direction to thereby change a photographing magnification, comprising:
a lens group movably disposed along a first optical axis;
a reflective optical element configured to be movable along a second optical axis extending in a direction intersecting with the first optical axis, and to bend a light beam incident from said lens group in a direction of the second optical axis, to thereby guide the light beam to an image-forming plane when said lens group has moved to the shooting position along the first optical axis, and move to a retracted position along the second optical axis to form a space for accommodating said lens group when said lens group has moved to the collapsed position along the first optical axis;
a first actuator for actuating said reflective optical element in the direction of the second optical axis; and
a non-reflective optical element disposed between said reflective optical element and the image-forming plane,
wherein said non-reflective optical element can be moved in the direction of the second optical axis together with a second actuator for actuating said non-reflective optical element, the second actuator being disposed, at least when said lens group is in the collapsed position, at a location where the second actuator overlaps said reflective optical element when viewed from the direction of the first optical axis.

2. The image pickup apparatus according to claim 1, wherein the second actuator is disposed, at least when said lens group is in the collapsed position, at a location where a whole range of the second actuator overlaps said reflective optical element when viewed from the direction of the first optical axis, such that the position thereof in the direction of the second optical axis coincides with a position of said reflective optical element.

3. The image pickup apparatus according to claim 1, wherein said non-reflective optical element is a diaphragm-shutter element including a plurality of blades, and the second actuator drives the plurality of blades to open and close the plurality of blades.

4. The image pickup apparatus according to claim 1, wherein the second actuator is disposed in a manner protruding from said non-reflective optical element toward said reflective optical element in parallel with the second optical axis, and a space for accommodating said reflective optical element is formed in a space surrounded by the second actuator and said non-reflective optical element.

5. The image pickup apparatus according to claim 1, wherein when said reflective optical element is in the shooting position, the second actuator overlaps said reflective optical element when viewed from the direction of the first optical axis.

6. The image pickup apparatus according to claim 5, wherein said zoom lens barrel includes a group barrel holding the lens group, and the second actuator is disposed inside of the group barrel when viewed from the direction of the first optical axis.

* * * * *